UNITED STATES PATENT OFFICE.

AUGUSTUS M. FENNER, OF LINESVILLE, PENNSYLVANIA.

PAINT COMPOUND.

SPECIFICATION forming part of Letters Patent No. 241,640, dated May 17, 1881.

Application filed February 7, 1881. (No specimens.)

*To all whom it may concern:*

Be it known that I, AUGUSTUS M. FENNER, of Linesville, in the county of Crawford and State of Pennsylvania, have invented certain new and useful Improvements in Paint Compounds; and I do hereby declare that the following is a full, clear, and exact description of the invention, which will enable others skilled in the art to which it appertains to make and use the same.

This invention relates to a new and useful compound for paint; and it consists of the following ingredients, in the annexed proportions, to wit: india-rubber, four and one-half pounds; benzine, six gallons; linseed-oil, twenty-five gallons; spirits turpentine, two gallons; water, eight gallons; unslaked lime, one pound; sugar of lead, one-half pound; sulphate of zinc, one-half pound; white lead, (ground in linseed-oil,) one hundred and twenty-five pounds; oxide of zinc, (ground in linseed-oil,) one hundred pounds.

This quantity will make about fifty gallons of paint, to prepare which I proceed as follows: The benzine, with the india-rubber, is placed, in a suitable vessel, in a water-bath, where it is heated until the rubber is thoroughly dissolved. The solution is then placed in a vat sufficiently large to hold the quantity of paint which is being made, and the linseed-oil and turpentine added. In a separate vessel I then mix the unslaked lime, sugar of lead, sulphate of zinc, and water, which mixture is then strained into the vat. I finally add the white lead and oxide of zinc, and stir until the compound is thoroughly mixed, when the compound is ready for use. This makes a very beautiful and durable paint, and at less expense than many inferior compounds now in general use.

When colored paints are required I substitute for a portion of the white lead and oxide of zinc (which are deducted in order to retain the proper consistency) such colored pigment as may be required.

I am well aware that rubber, with one or more of its solvents, has been used before as one of the ingredients of "rubber paint" and other paint compounds, and I am also aware that quicklime has been used as an ingredient in paint compounds. Hence I do not claim a paint compound containing these ingredients; but

What I claim, and desire to secure by Letters Patent of the United States, is—

The herein-described improved paint compound, consisting of india-rubber, benzine, linseed-oil, spirits of turpentine, water, unslaked lime, sugar of lead, sulphate of zinc, white lead, and oxide of zinc, in about the proportions and for the purpose set forth.

In testimony that I claim the foregoing as my own I have hereto affixed my signature in presence of two witnesses.

AUGUSTUS M. FENNER.

Witnesses:
GEORGE T. RANKIN,
BRAD T. GAUGH.